Patented Dec. 30, 1930

1,787,315

UNITED STATES PATENT OFFICE

HANS PAUL KAUFMANN, OF JENA, AND MAX SCHUBERT, OF FECHENHEIM, NEAR FRANKFORT-ON-THE-MAIN, GERMANY, ASSIGNORS TO I. G. FARBENINDUSTRIE AKTIENGESELLSCHAFT, A CORPORATION OF GERMANY

NEW COMPOUNDS OF THE THIAZOLIC SERIES AND PROCESS OF MAKING SAME

No Drawing. Application filed April 12, 1927, Serial No. 183,228, and in Germany April 15, 1926.

Our invention relates to new compounds containing sulfur, having probably in their molecule a thiazol ring and corresponding to the general formula:

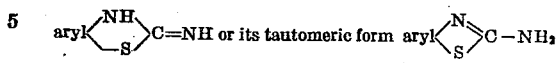

wherein aryl means an aromatic residue of the benzene, naphthalene, anthracene or anthraquinone series, which may contain further substituents, which products may be obtained by allowing a salt of sulfocyanic acid to act on primary arylamines, in which the para-position to the amino-group is either substituted by a monovalent radicle or blockaded (as f. i. in the case of β-naphthylamine), in the presence of a suitable halogen (Cl or Br) and preferably in an acidic medium.

The reaction runs probably in such a way, that in the first phase ortho-aminosulfocyanic compounds of the general formula:

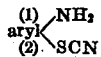

are formed, which by the influence of the acidic medium or of the acid resulting from the reaction are converted into the isomeric aminothiazolic compounds, either in statu nascendi or after standing for some time or warming of the acidic reaction mass. By treating the separated ortho-aminosulfocyanic compounds with dilute acids or by heating them preferably higher than their melting point they are converted into the aminothiazolic compounds.

The new thiazolic compounds are mostly crystalline bodies, having a definite melting point. They possess a basic character, but their amino group is masked in most cases, as indicated by the aforesaid first formula for these compounds, because the new compounds yield in most cases, when diazotised in the usual manner, compounds having only a weak capacity for coupling with the usual azodyestuff components.

The new compounds are valuable intermediates for the production of dyestuffs and pharmaceutical products.

The following examples will further illustrate our invention, but it is understood, that our invention is not limited to the particular proportions, reacting conditions or materials listed therein.

Example 1

9 parts of 1.4-dimethyl-2-amino-5-chlorobenzene are mixed with about 120 parts of 96% acetic acid and 18 parts of sodium sulfocyanide. Then a solution of 9 parts of bromine in 20 parts of acetic acid is slowly added at ordinary temperature. The product of reaction separates from the mixture in colorless crystals. It is filtered and washed with a solution of sodium carbonate and for purifying, it is redissolved in dilute hydrochloric acid and precipitated with a solution of a suitable alkali. When recrystallized from dilute spirit, the new compound melts at 245° C. With nitrous acid it does not yield a diazocompound capable of combining with azocomponents. The new compound corresponds probably to the formula:

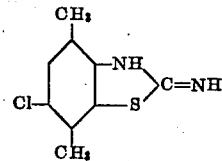

Example 2

8 parts of 1-methyl-2-amino-5-chlorobenzene are mixed with 50 parts of 96% acetic acid or the corresponding amount of a suitable mineral acid, f. i. with about 300 parts of 15% sulfuric or hydrochloric acid, then a solution of 18 parts of sodium sulfocyanide in 70 parts of acetic acid and at 10–15° C. while stirring a solution of 9 parts of bromine in 20 parts of acetic acid are added. After stirring for some time the solution is diluted with about 500 parts of water and a solution of sodium carbonate or any other suitable alkali is added until the solution is feebly alkaline. The colorless crystalline precipitate, thus formed, is filtered. It is purified by redissolving in dilute hydrochloric acid and precipitating by adding a suitable alkali. Recrystallized from spirit, the new compound melts at 203° C. It corresponds probably to the formula:

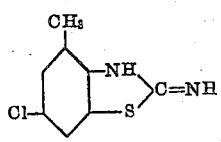

Example 3

9 parts of para-phenetidine are treated in an analogous manner as described in the foregoing examples. The product of reaction shows, when recrystallized from dilute spirit, a melting point of 163° C. It corresponds probably to the formula:

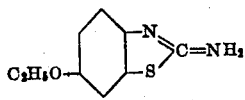

The new compound is quite soluble in hydrochloric acid and yields with nitrous acid a yellowish diazocompound, which couples with resorcinol to a red, with $H$-acid to a blue, with 2-naphthol-7-sulfonic acid to a reddish violet azodyestuff.

Under the same conditions monoacet-para-phenylenediamine yields an analogous compound, having probably the following constitution:

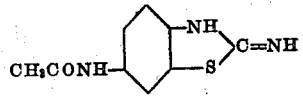

Example 4

Into a solution of 8 parts of para-chlor-aniline and of 18 parts of potassium sulfocyanide in about 130 parts of 90% formic acid the calculated quantity of chlorine is introduced in a slow current while cooling moderately. The clear solution is poured on a dilute solution of caustic soda and the separated precipitate is filtered. The new compound crystallizes from dilute spirit in colorless needles, melting at 192° C. It corresponds probably to the formula:

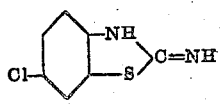

Example 5

9 parts of 4-chloro-1-naphthylamine are mixed with 20 parts of potassium sulfocyanide and 200 parts of glacial acetic acid and while cooling and stirring a solution of about 9 parts of bromine in 20 parts of glacial acetic acid is added slowly. Then the reaction mixture is allowed to stand for some hours or it is warmed for a short time in order to accelerate the reaction. The separated pulp of crystals is filtered, washed with a solution of sodium carbonate and dried. The new compound, thus obtained, possesses probably the following constitution:

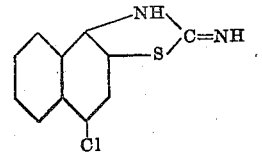

It crystallizes from spirit in colorless needles, melting at 247° C. It is easily soluble in spirit, glacial acetic acid, benzene and ether, and is difficultly soluble in dilute hydrochloric acid. It does not yield a diazocompound.

Example 6

86 parts of 2-amino-7-naphtholmethylether are dissolved in 450 parts of glacial acetic acid and a solution of 190 parts of potassium sulfocyanide in about 120 parts of glacial acetic acid is added. To this mixture a solution of about 75 parts of bromine in 350 parts of glacial acetic acid is added at about 10–15° C. while stirring. After stirring the mass for some hours it is poured on water, the precipitate is filtered, washed with a solution of sodium carbonate and recrystallized from spirit. The new compound, having probably the formula:

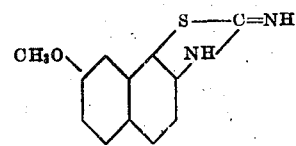

is obtained in colorless needles, melting at 238° C. It is soluble in the usual organic solvents and in dilute acids. Its solution in concentrated sulfuric acid is colorless.

Example 7

If in the same manner a solution of β-naphthylamine in glacial acetic acid is mixed with a solution of sodium sulfocyanide in the same acid and a solution of bromine is added, and if then the mixture stands for some hours or is warmed for a short while, the 1-sulfocyanogeno-2-naphthylamine formed in the first phase of the reaction, is converted into the corresponding thiazole compound of the probable formula:

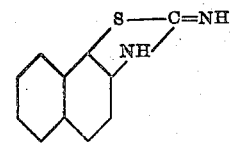

It is obtained in colorless crystals, melting at 259–261° C.

In order to isolate the primary reaction product, i. e., the 1-sulfocyanogeno-2-naphthylamine, the above described reaction must be carried out with careful cooling of the reaction mass which must be worked up immediately after the whole quantity of bromine has been added. The isolated 1-sulfocyanogeno-2-naphthylamine may be converted into the isomeric thiazolic compound in the following manner: 7 parts of it are dissolved in 250 parts of warm alcohol and this solution is acidified with hydrochloric or sulfuric acid and boiled for a short while. After cooling the chloride or sulfate respectively of the thiazole compound separates. By the action of alkalies the free base is obtained; it is identical with the compound prepared as described above.

When treated in the same manner, also the 2.4-disulfocyanogeno-anilin which is obtainable as a by-product when aniline is mixed with sodium sulfocyanide in an acetic acid solution and bromine is added, and the 2.4-disulfocyanogeno-1-naphthylamine obtainable by the interaction of an alkali metal salt of sulfocyanic acid and α-naphthylamine in the presence of bromine are converted into the corresponding aminothiazolic compounds of the probable formulæ:

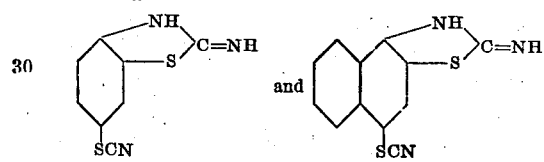

respectively.

Example 8

20 parts of β-anthramine and 20 parts of potassium sulfocyanide are suspended in a mixture of 200 parts of methylacetate and 100 parts of glacial acetic acid. Then a solution of 18 parts of bromine in 60 parts of glacial acetic is added while stirring and cooling. The mixture is stirred for some time and then diluted with water. The new compound separates thereby in flakes. For purifying it is dissolved in glacial acetic acid and precipitated by adding water. It is thus obtained in the form of yellow leaflets, melting at 320° C. It corresponds probably to the formula:

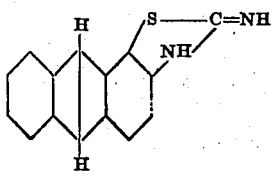

We claim:

1. A process for producing new compounds of the thiazolic series which comprises allowing a salt of sulfocyanic acid to act on primary arylamines, wherein the para-position to the aminogroup is either substituted by a monovalent radicle or blockaded, in the presence of a halogen.

2. A process for producing new compounds of the thiazolic series which comprises allowing a soluble salt of sulfocyanic acid to act on primary arylamines, wherein the para-position to the aminogroup is either substituted by a monovalent radicle or blockaded, in the presence of a halogen.

3. A process as claimed in claim 2 in which the reaction is carried out in an acidic medium.

4. A process as claimed in claim 2 in which the reaction is carried out in an acidic medium and the reaction mixture is allowed to stand for some time.

5. A process as claimed in claim 2 in which the reaction is carried out in an acidic medium and the reaction mixture is heated.

6. A process as claimed in claim 2 in which the reaction is carried out in an acidic medium and the reaction mixture is heated to temperatures ranging from ordinary temperatures to 100° C.

7. A process which comprises allowing a soluble salt of sulfocyanic acid to act on a β-naphthylamine compound in an acidic medium in the presence of a halogen.

8. A process according to claim 7 in which the reaction mixture is allowed to stand for some time.

9. A process according to claim 7 in which the reaction mixture is heated for a short time.

10. A process for producing new compounds of the thiazolic series which comprises treating ortho-aminosulfocyanic compounds of the general formula:

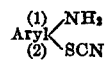

in an acidic medium.

11. A process for producing new compounds of the thiazolic series which comprises heating ortho-aminosulfocyanic compounds of the general formula:

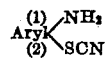

in an acidic medium.

12. A process which comprises heating a 1-sulfocyanogeno-2-naphthylamine compound in an acidic medium.

13. As new products compounds containing sulfur, having probably a thiazole ring in their molecule and corresponding probably to the general formula:

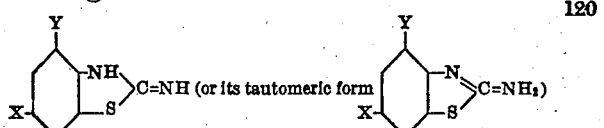

wherein X means an alkyloxy group or halogen and Y hydrogen or an alkyl group, which products are when dry crystalline bodies, having a definite melting point and possessing a basic character.

14. As a new product a compound containing sulfur, having probably a thiazole ring in its molecule and corresponding probably to the formula:
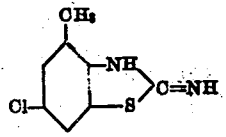
which is when dry a crystalline substance, melting at about 203° C. when recrystallized from spirit.
In testimony whereof, I affix my signature.
HANS PAUL KAUFMANN.
In testimony whereof, I affix my signature.
MAX SCHUBERT.